April 21, 1964 N. B. BRAYMER 3,130,373
POTENTIAL DIFFERENCE NEGATIVE FEEDBACK AMPLIFIER
Filed April 27, 1959 2 Sheets-Sheet 1
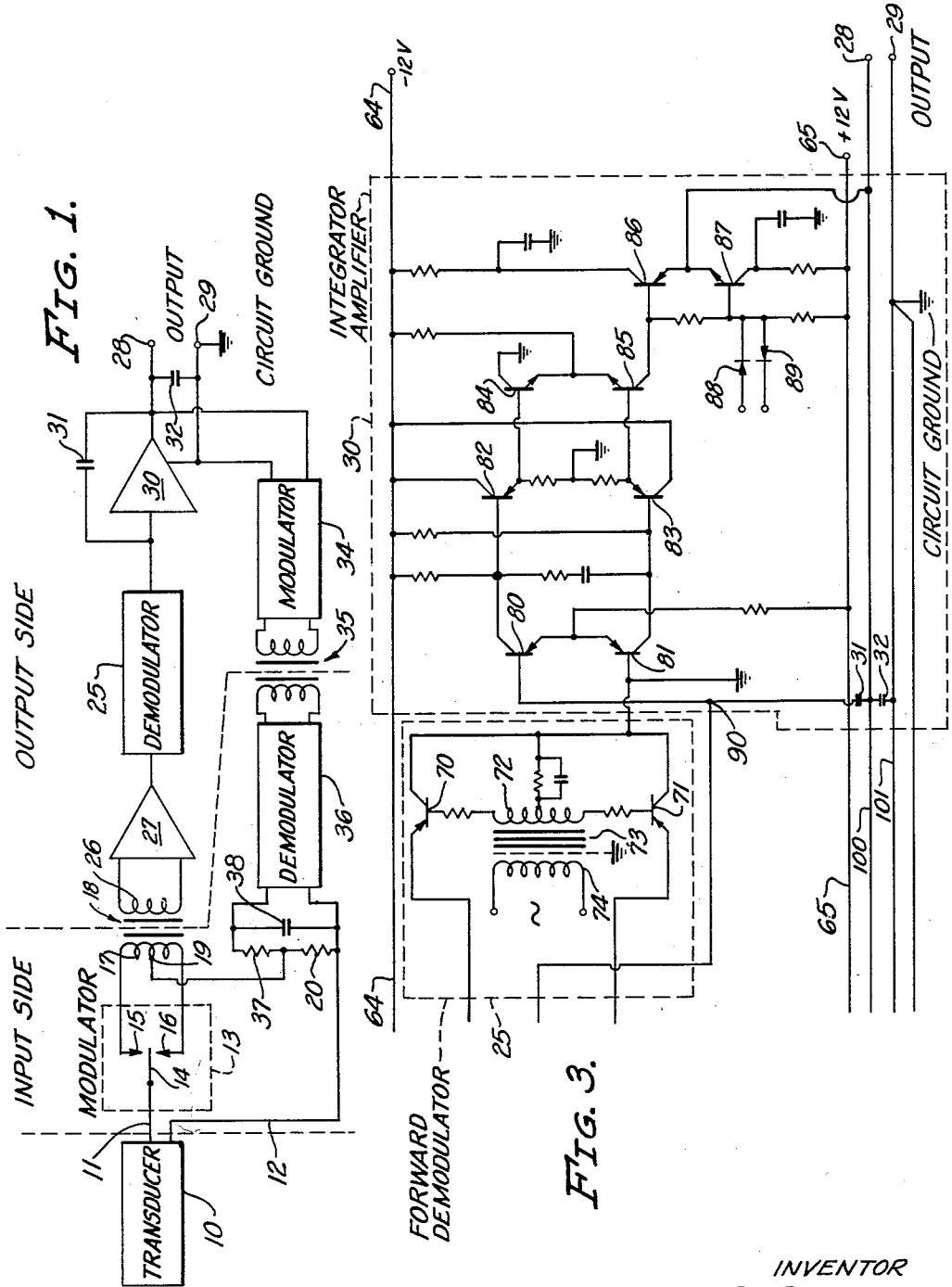
INVENTOR
NOEL B. BRAYMER
BY HIS ATTORNEYS
HARRIS KIECH, RUSSELL & KERN

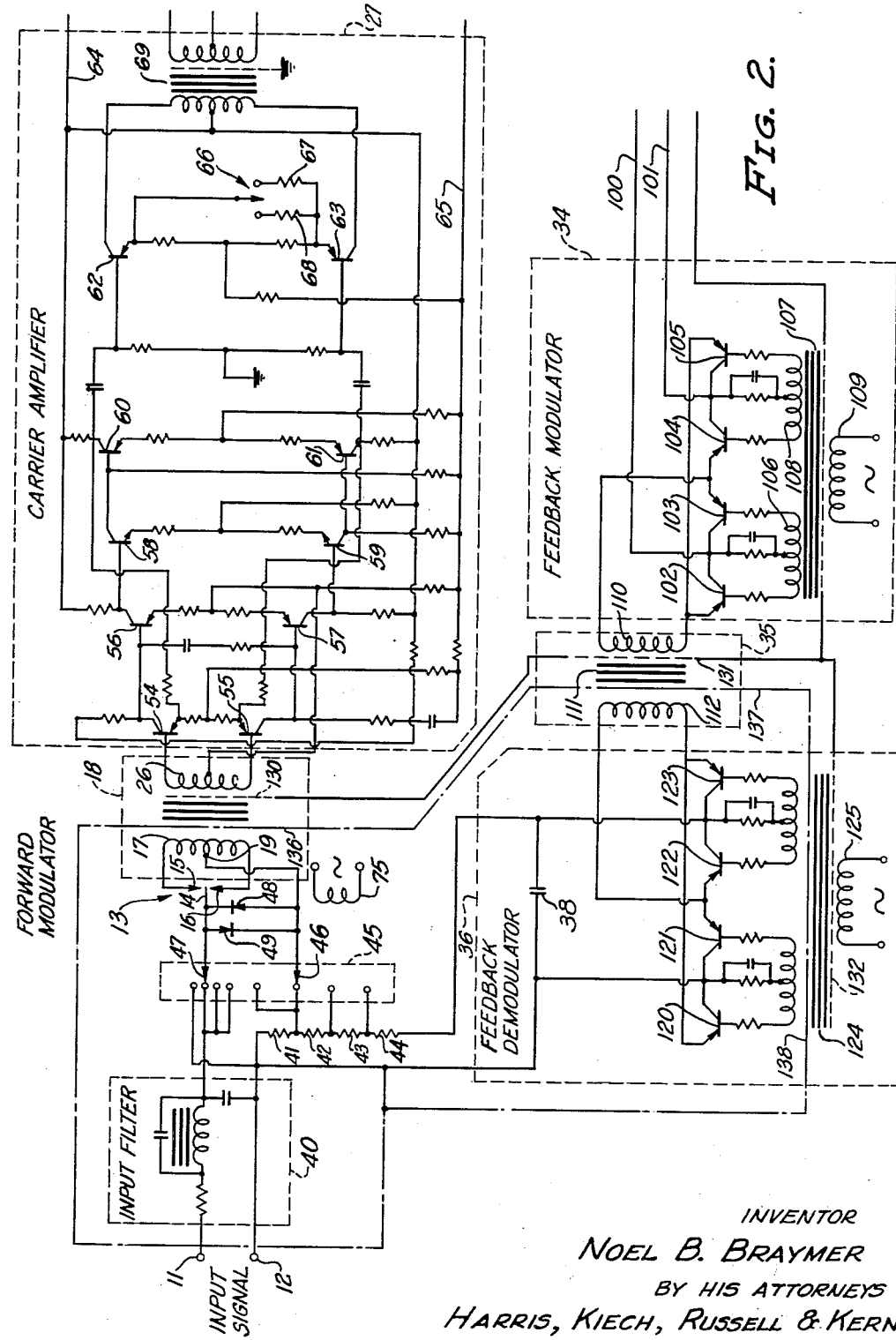

United States Patent Office 3,130,373
Patented Apr. 21, 1964

3,130,373
POTENTIAL DIFFERENCE NEGATIVE
FEEDBACK AMPLIFIER
Noel B. Braymer, Garden Grove, Calif., assignor to
Beckman Instruments, Inc., a corporation of
California
Filed Apr. 27, 1959, Ser. No. 823,796
11 Claims. (Cl. 330—9)

This invention relates to a potential difference transfer device and, in particular, to a device for the generation of a potential across a pair of terminals, one of which is a reference terminal or common circuit ground, in response to a potential difference existing between two conductors which may be the terminals of a transducer, both of which conductors have an unknown and/or a variable potential difference with respect to the common circuit ground. The pair of terminals across which the device generates a potential are ordinarily referred to as the output terminals and the two conductors from the transducer or other source are ordinarily referred to as the input terminals.

It is well known in low level voltage measurements that even the potentials along a single chassis ground can differ. This phenomenon is more apparent in systems that occupy large areas, such as data measuring systems designed to take measurements distributed over a large plant. Ground potential differences of several volts can be observed in such systems. When the full range of the measurements being made is of the order of millivolts and a high accuracy, such as one part in one thousand, is required, special problems arise that can only be dealt with by highly specialized devices such as that which is the subject of the present invention. It is not possible to include ground loops in the transmission lines from a transducer to a measuring device in systems of the type being considered herein. Therefore, when the transducer, which may primarily be a two terminal device, has to be connected to a measuring system, this is done by use of two separate isolated conductors.

Furthermore, because of the occurrence of changing electrostatic and electromagnetic fields and the practical impossibility of complete shielding of long leads, it is necessary that both conductors from the transducer to the measuring system be affected in the same way by stray electrostatic and electromagnetic fields. The voltage generated by stray electrostatic fields through the shielding then appears as a common mode voltage, i.e., a voltage, generally fluctuating, generated by electrostatic fields on both conductors in the same sense.

Common mode voltage in actual systems may be in the order of one volt whereas the entire range of the signal voltages, i.e., the differences in voltage between the two leads of a transducer, will in many cases be less than ten millivolts. It is clear that isolation is necessary between the input side of a system and the indicating side. The input signals to be handled by the system will be D.C. or slowly varying voltages which require direct coupled amplifiers and the like. Throughout the specification and claims, these slowly varying signals will be referred to as D.C. signals.

It is an object of the invention to provide a device for transferring a potential difference between a pair of input terminals which are electrically isolated with respect to circuit ground to a pair of output terminals, one of which may be at circuit ground. A further object is to provide such a device which is highly accurate, not susceptible to zero drift, fast in operation, simple to build and not susceptible to changes in component characteristics as might be caused by extraneous factors such as temperature changes and the like.

It is an object of the invention to provide a potential difference transfer device for operation with floating inputs and grounded outputs having high common mode rejection, high input impedance and low output impedance, while providing virtually complete electrical isolation between the input and output pairs. A further object of the invention is to provide such a device having a first signal isolating means in a forward path between the input and output and a second signal isolating means in a feedback path between the output and input so that inverse feedback voltages can be supplied to the input from the output while remaining electrically isolated therefrom.

It is an object of the invention to provide a potential difference transfer device having an A.C. error amplifier, a D.C. output amplifier, and a feedback component for carrying the output voltage into a floating attenuator with the gain of the device set by the attenuator and with the difference between the input signal and the attenuated feedback signal modulated and amplified in the A.C. error amplifier and then demodulated to a D.C. signal for feeding to the output amplifier. A further object of the invention is to provide such a device wherein the output error signal is integrated by an operational amplifier having extremely high loop gain and providing a low output impedance for driving external loads, permitting the output to be used directly in analog computers, controllers and data recording systems.

It is an object of the invention to provide a potential difference transfer device in which a floating input signal is modulated at the input side of the device and then coupled to the output side by a transformer providing electrical isolation between the input and output sides, after which the signal is demodulated to provide a D.C. output, one terminal of which may be grounded. A further object of the invention is to provide such a device in which at least a portion of the D.C. output signal is modulated and coupled to the input side of the device by a transformer which provides electrical isolation between the output and input sides, after which the feedback signal is demodulated to provide a D.C. signal, at least a portion of which is combined with the input signal in inverse relation. A further object is to provide such a device with a D.C. output amplifier of the operational type having a capacitance coupled across the input and output thereof so the amplifier will function as an integrator and also to provide a very low apparent output impedance for the device.

It is an object of the invention to provide a potential difference transfer device of the type described herein using a mechanical chopper as an input signal modulator. A further object is to provide such a device using a transistor switch demodulator operating at the same frequency as the input signal modulator. Another object of the invention is to provide such a device utilizing a carrier amplifier for reducing the voltage and current offset of transistor switches. A still further object of the invention is to provide such a device which may be constructed and operated without the use of vacuum tubes.

The invention also comprises novel details of construction and novel combinations and arrangements of parts together with objects, advantages, features and results, which will more fully appear in the course of the following description. The drawings merely show and the description merely describes preferred embodiments of the present invention which are given by way of illustration or example.

In the drawings:
FIG. 1 is a block diagram of a preferred embodiment of the invention;
FIG. 2 is a portion of a schematic of a device embodying the teachings of the invention; and
FIG. 3 is the remainder of the schematic of FIG. 2.
Referring now to FIG. 1, a transducer 10, which may be thermocouple, a strain gauge, a thermistor or the like, is depicted as a two-terminal device and is connected by leads 11, 12 to the input side of the circuit. Normally, these leads will be twisted in order to reduce pickup of time varying magnetic fields and will be enclosed in a conducting shield in order to reduce the pickup of electrostatic fields. Normally there is an impedance path between the input signal circuit and ground adjacent the transducer and, in many cases, the transducer will be directly grounded. As transducer ground and circuit ground are different, a voltage exists which is common to both signal leads. This voltage may be conveniently defined as the potential difference between circuit ground and the signal lead having the lower impedance to ground and is called common mode voltage. This is independent of the signal voltage.

The input signal from the transducer is combined in series with an attenuated feedback signal, developed across a resistor 20 and derived as will be explained hereinafter. The attenuated feedback signal opposes the transducer signal and the combination of the two is called a difference or error signal. As is always the case in amplifiers with negative feedback, the amplifier gain tends to reduce the error signal to a very small value, or in other words, to bring about a situation in which the transducer signal and the attenuated feedback signal are almost equal and opposite. The error signal is coupled to a modulator 13 which may be of any conventional type, but is preferably a mechanical chopper having a moving arm 14 and stationary contacts 15, 16. The lead 11 is connected to the moving arm 14 and the fixed contacts 15, 16 are respectively connected to the ends of a primary winding 17 of an isolating transformer 18. The lead 12 is connected to a center tap 19 on the primary winding 17 through the resistor 20.

When the modulator is operating, current will alternately flow in opposite sense in the primary 17 of the transformer when there is a voltage difference between the two leads 11, 12, but no current flow will result when the potential difference between the two leads is zero. A mechanical chopper is preferred for the modulator 13 because of the low impedance obtainable by the contacts of the mechanical chopper are best suited for use with transducers which generally have a very low voltage range.

The A.C. signal from the transformer 18 is demodulated in a demodulator 25 to provide a D.C. output signal. The A.C. signal is preferably amplified prior to demodulation to raise the signal level, secondary winding 26 of the transformer 18 being connected as the input to an A.C. amplifier 27. The amplifier output is then coupled to the demodulator 25 as an input. The A.C. amplifier 27 may be conventional in design, as may the demodulator 25. As the signal level has been increased from that of the transducer, more convenient electrical demodulators, such as transistor switches, can be used in place of a mechanical chopper. Of course, the modulator 13 and demodulator 25 are operated in synchronism and preferably from the same driving voltage source.

A transistor demodulator will usually consist of two alternately opening and closing transistor switches, each of which introduces a voltage and current offset. Where the incoming signal is very small, this offset would be a serious source of error; however, the A.C. amplifier 27 provides a high signal level, thus proportionally reducing any error due to uncompensated offset in the demodulator.

The D.C. output of the demodulator 25 is connected to output terminals 28, 29 through a D.C. amplifier 30. This amplifier is preferably of the operation type having a capacitor 31 coupled across its input and output and functions as an integrator. A capacitor 32 is connected across the output of the amplifier. The purpose and operation of the integrator circuit will be discussed subsequently.

At least a portion of the D.C. output signal appearing at the output terminals 28, 29 is fed back to the input signal on the leads 11, 12 in inverse relation to provide a closed loop system so that the output of the device will be independent of changes in characteristics of components and the like. The feedback circuit includes a modulator 34, an isolating transformer 35, and a demodulator 36. The D.C. output signal is coupled to the modulator 34 as an input, the modulated output thereof is coupled to the demodulator 36 by the transformer 35, and the demodulated output is developed across a feedback impedance consisting of serially connected resistors 20, 37, in parallel with a capacitor 38. As the signal level is relatively high, transistor switches are preferred for the modulator 34 and demodulator 36, although any type of units can be used. The amount of feedback can be controlled by varying the input to the modulator 34, the relative values of the resistors 20, 37, or by other suitable means.

With the arrangement of FIG. 1, there is a forward signal path from the transducer 10 through the modulator 13, the isolating transformer 18, the A.C. amplifier 27, the demodulator 25, and the D.C. amplifier 30 to the output terminals, and a rearward feedback path through the modulator 34, the isolating transformer 35, and the demodulator 36. One signal terminal of the demodulator 25, the modulator 34, and the amplifiers 27 and 30 may be connected to circuit ground as is the output terminal 29. However, it is not necessary that any signal terminal of the transducer 10, the modulator 13 or the demodulator 36 be grounded, thereby permitting the potential difference transfer device to have a floating input with a grounded output. This device is provided with a closed feedback path from the grounded output side to the floating input side which permits the output to be very stable and independent of component characteristics.

The accuracy of the transfer device of the invention is primarily possible because of the extremely high local loop gain of the integrator, and the low output impedance for driving external loads. The high loop gain makes the accuracy independent of the change of any parameters in the forward path so that the signal transfer depends exclusively on the feedback path. The low output impedance permits a considerable external load on the system and also prevents any current in the feedback path from causing deterioration of the output signal.

A very high D.C. and low frequency gain is achieved by the combination of the amplifier 30 and the capacitor 31 forming an integrator with the demodulator 25. The capacitor 31 is selected to have an extremely high impedance at low frequencies. The gain is equal to the quotient of this impedance and the input impedance, i.e., the impedance of the demodulator 25, and may be very high for low frequency signals, e.g., up to several millions. Accordingly, at D.C. or very low frequency, only an extremely small error signal current exists. On the other hand, the time constant of the integrator restricts the use of this type of transfer device to relatively slowly varying signals.

Since the impedance of the capacitor 31 is low at higher frequencies, the parameters of the circuit may be chosen so that the gain of the integrator drops to unity at a relatively low frequency, e.g., 100 cycles per second. The reduction of the gain to unity is required for any frequencies for which the phase shift between the input and output becomes more than 180° in order to prevent oscillation of the circuit.

The output impedance of the transfer device, both to the external load and to the feedback path, would normally be inversely proportional to the gain. However, a low output impedance for higher frequencies, where the integrator is of little or no help, is produced by the capacitor 32 connected across the output leads, which capacitor tends to keep the voltage thereacross constant without having any influence on the gain of the integrator.

The feedback load on the transfer device has low frequency and high frequency components, the high frequency components occurring because the low frequency output signal can only be switched in a finite time by the feedback modulator 34. When a low frequency output signal is applied to a demodulator, the signal is first applied to a set of terminals in one sense through a first pair of switches and then in the opposite sense through a second pair of switches with crosswise orientation relative to the first pair. In case the two pairs of switches should be closed simultaneously, the output signals would, of course, be shorted, which is not desirable. To compensate for errors in switch timing, it is customary to separate the closed condition of each pair of switches by a finite amount of time. Therefore, the feedback current existing as a result of a substantially D.C. output voltage is pulsed, which is identical to a current having D.C. and high frequency components.

The external load may be continuous, but more frequently has an intermittent character. This occurs, for instance, when a plurality of transfer devices are connected in turn to an output device. The external load is then connected to each transfer device for a time which is small in comparison to the time during which the transfer device is connected to a transducer and also small in comparison to the inverse of the frequency characteristics of the incoming signal after the usual filtering.

The above conditions would ordinarily produce a pulse feedback signal. However, the capacitor 38 connected across the feedback attenuator causes the feed back signal as applied in opposition to the input signal to be essentially D.C. The feedback path between the output and the attenuator has a low impedance when either pair of switches is closed and high impedance when all switches are open. Because the input impedance of the transfer device is high, virtually no significant discharge of the capacitor 38 occurs during the time all four switches of the modulator 34 and the demodulator 36 are open.

Typical values of a transfer device as shown in FIG. 1 are: effective output impedance of the demodulator 25, 80,000 ohms; gain of the amplifier 30, 10,000; intrinsic output resistance of the amplifier 30, 500 ohms; effective output impedance of the integrator, 50 milliohms; loop gain, 5,000,000; capacitor 31, 10 microfarads; frequency range, D.C., to 100 cycles per second.

FIGS. 2 and 3 show a floating input to grounded output potential difference transfer device embodying the teaching of the invention. Units in the circuit of FIGS. 2 and 3 corresponding to those of FIG. 1 are identified by the same reference numerals. The input signal appearing on the leads 11, 12 is coupled into the circuit through a low pass filter 40 which may be conventional in design. The feedback impedance consists of resistors 41, 42, 43 and 44 connected in series across the output of the feedback demodulator 36. A two-pole four-position switch 45 provides for three different feedback ratios with a moving contact 46 connecting a selected one of the junction points between the resistor 41–44 to the center tap 19 of the input winding 17 of the isolating transformer 18. The other moving arm 47 of the switch 45 connects the other side of the input signal to the moving arm 14 of the chopper modulator 13. When the switch is in the uppermost of the four positions, the amplifier input is shorted. Rectifiers 48, 49, which preferably are silicon crystal diodes, are connected across the inputs to the modulator 13 in opposing polarities to limit the magnitude of the input error signal.

The modulator input signal is coupled to the A.C. or carrier amplifier 27 by the isolating transformer 18. The amplifier 27 is a five stage stage push-pull type with transistors 54, 55 as the first stage, transistors 56, 57 as the second stage, transistors 58, 59 as the third stage, transistors 60, 61 as the fourth stage, and transistors 62, 63 as the fifth or output stage. Minus 12 volts D.C. is applied to the amplifier on lead 64 and plus 12 volts D.C. on lead 65. A single-pole double-throw switch 66 provides for connection of either of resistors 67 or 68 between the emitters of the transistors 62, 63 for varying the gain of the amplifier 27.

The amplified A.C. error signal is coupled from the amplifier 27 to the forward demodulator 25 by an output transformer 69. The modulator 25 includes transistors 70, 71 which are energized 180° out of phase via a secondary 72 of a transformer 73, the transistors serving as switches to form a full wave synchronous rectifier. Primary winding 74 of the transformer 73 is energized from an A.C. source, preferably the same source which energizes driving winding 75 of the chopper modulator 13 so that the demodulator 25 and modulator 13 will operate in synchronism.

The demodulated output signal is coupled directly to the D.C. or integrator amplifier 30 which is a conventional operational amplifier with transistors 80, 81 as the first stage, and transistors 82, 83 as a second stage. Transistors 84, 85 comprise a third stage and the output is developed between the emitters of transistors 86, 87. Upper and lower limit clamp voltages are connected to the base of transistor 87 through rectifiers 88, 89, respectively, to limit the magnitude of the output signal. The capacitor 31 is connected between the output terminal 28 and input terminal 90 of the amplifier 30 and the capacitor 32 is connected across the output terminals 28, 29.

The output signal at terminals 28, 29 is connected as an input to the feedback modulator 34 through leads 100, 101, respectively. The feedback modulator includes transistors 102, 103, 104 and 105 operated as switches and connected as a ring modulator, the transistors 102 and 103 being controlled by the voltage of a secondary winding 106 of a transformer 107 and the transistors 104 and 105 being controlled by another secondary winding 108. An A.C. voltage is connected to a primary winding 109 of the transformer 107 for driving the modulator. The modulated feedback signal is developed across a primary winding 110 of an isolating transformer 111 and a secondary winding 112 couples the feedback signal to the feedback demodulator 36.

The feedback demodulator 36 includes transistors 120, 121, 122, 123 and a transformer 124 corresponding to the transistors and transformer of the feedback modulator 34, with primary winding 125 of the transformer 124 preferably energized from the same source as the primary winding 109 so that the modulator and demodulator will operate in synchronism. The demodulated feedback signal is developed across the resistors 41–44 and the capacitor 38 as previously described.

All of the grounds indicated in the amplifiers 27 and 30 are connected to a common circuit ground as is the output terminal 29. The shields in the single shielded transformers 69, 73 and 107 may also be connected to this common circuit ground. However, it should be noted that there are no grounds present or required in the input side of the circuit comprising the input filter, the forward modulator and the feedback demodulator.

A particular type of shielding circuit for the input side of the potential difference transfer device is shown in the circuit of FIG. 2. While this type of shielding is preferred, it is not essential to the practice of the invention and does not constitute a part of the invention. The purposes and functions of the shielding are described in detail in the copending application of Taylor C. Fletcher, entitled "Shielding Circuit," Serial No. 770,386, filed October 29, 1958, which application is assigned to the same assignee as the present application, now patent No. 3,100,282.

In this preferred input shielding arrangement, the transformers 18, 35 and 124 are provided with double shields. A shield 130 around the secondary winding 26 of the transformer 18, a shield 131 around the primary winding 110 of the transformer 111, and a shield 132 around the primary winding 125 of transformer 124 are connected to the common circuit ground. A shield 136 around the primary winding 17 of the transformer 18, a shield 137 around the secondary winding 112 of the transformer 111, and a shield 138 around the secondary winding of the transformer 124 are interconnected to form a shield around the input side connected to the input lead 12.

In the operation of the device of the invention, the forward modulator and demodulator are ordinarily operated at 400 cycles per second because of limitations imposed by the mechanical chopper 13. Choppers are also available for operation in the range of 60 to 1000 cycles per second while electrical modulators and demodulators may be operated at much higher frequencies. Ordinarily, the feedback modulator 34 and demodulator 36 are also operated at 400 cycles per second.

A floating input to grounded output potential difference transfer device of the type described herein will have an input impedance in excess of ten megohms and an output impedance of less than one ohm with an input band width of zero to fifty cycles per second. The common mode rejection will be in the order of one million to one while the gain may be adjusted as desired, a range of one hundred to one thousand being typical.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a feedback amplifier for transferring a D.C. potential difference from an input to a grounded output, the combination of: input terminals and output terminals; a feedback impedance; first signal isolating means having an input and an output, the output being conductively and electrostatically isolated from the input thereof; second signal isolating means having an input and an output and including a modulator, a demodulator and a transformer coupling said modulator to said demodulator, the output of said second signal isolating means being conductively and electrostatically isolated from the input thereof; a first circuit means connected to said input terminals, to at least a portion of said feedback impedance and to the input of said first signal isolating means for coupling a potential appearing across the input terminals in series with at least a portion of a potential appearing across said feedback impedance as an input to said first signal isolating means; a second circuit means coupled to the output of said first signal isolating means, coupled across said output terminals and coupled to said second signal isolating means as an input for transferring a signal from the output of said first isolating means to said output terminals and for transferring at least a portion of the signal across said output terminals to the input of said second signal isolating means; and a third circuit means coupled between the output of said second signal isolating means and said feedback impedance for applying the output of said second signal isolating means across said feedback impedance.

2. In a device for transferring a potential difference from an input to an output, the combination of: a first modulator; a first transformer; a first demodulator; means connecting said first modulator, first transformer and first demodulator in series to provide a forward signal path between said input and said output; a second modulator; a second transformer; a second demodulator; means connecting said second modulator, second transformer and second demodulator in series to provide a feedback signal path connected between said output and said input; and said last means including circuit means for connecting at least a portion of the output of said second demodulator as an input to said first modulator in negative feedback relation.

3. In a device for transferring a potential difference between input and output terminals, the combination of: a first modulator for producing an A.C. output; a first demodulator for producing a D.C. output from an A.C. input; a first transformer for coupling said first modulator output to said first demodulator as an input; a second modulator for producing an A.C. output; a second demodulator for producing a D.C. output from an A.C. input; a second transformer for coupling said second modulator output to said second demodulator as an input; first circuit means for coupling at least a portion of the output of said first demodulator to said second modulator as an input; and second circuit means for coupling at least a portion of the output of said second demodulator and a signal at the input terminals in negative feedback relation to said first modulator as an input, with said first modulator and said second demodulator floating with respect to the output terminal.

4. In a device for transferring a potential difference between input and output terminals, the combination of: a first modulator for producing an A.C. output; a first demodulator for producing a D.C. output from an A.C. input; a first transformer for coupling said first modulator output to said first demodulator as an input; an amplifier, with the output of said first demodulator coupled to said amplifier as an input; an integrating capacitance coupled across the input and output of said amplifier; a second modulator for producing an A.C. output; a second demodulator for producing a D.C. output from an A.C. input; a second transformer for coupling said second modulator output to said second demodulator as an input; first circuit means for coupling at least a portion of the output of said amplifier to said second modulator as an input; and second circuit means for coupling at least a portion of the output of said second demodulator and a signal at the input terminals in negative feedback relation to said first modulator as an input.

5. In a device for transferring a potential difference between input and output terminals, the combination of: a first modulator for producing an A.C. output; a first demodulator for producing a D.C. output from an A.C. input; a first transformer for coupling said first modulator output to said first demodulator as an input; an operational amplifier grounded to one of the output terminals, with the output of said first demodulator coupled to said amplifier as an input; a second modulator for producing an A.C. output; a second demodulator for producing a D.C. output from an A.C. input; a second transformer for coupling said second modulator output to said second demodulator as an input; first circuit means for coupling at least a portion of the output of said amplifier to said second modulator as an input; and second circuit means for coupling at least a portion of the output of said second demodulator and a signal at the input terminals in negative feedback relation to said first modulator as an input, with said first modulator and said second demodulator floating with respect to the output terminals.

6. In a device for transferring a potential difference between input and output terminals, the combination of: a first modulator for producing an A.C. output; a first demodulator for producing a D.C. output from an A.C. input; a first transformer for coupling said first modulator output to said first demodulator as an input; an A.C. amplifier coupled intermediate said first transformer and first demodulator; a D.C. amplifier with the output of said first demodulator coupled to said D.C. amplifier as an input; an integrating capacitor coupled across said D.C. amplifier input and output; a second modulator for producing an A.C. output; a second demodulator for producing a D.C. output from an A.C. input; a second transformer for coupling said second modulator output to said second demodulator as an input; first circuit means for coupling at least a portion of the output of said D.C. amplifier to said modulator as an input; and second circuit means for coupling at least a portion of the output of said second demodulator and a signal at the input terminal in negative feedback relation to said first modulator as an input.

7. In a device for transferring a potential difference between input and output terminals, the combination of: input terminals and output terminals; a first modulator for producing an A.C. output, said first modulator including a mechanical chopper having a moving contact and a pair of fixed contacts; means connecting one of said input terminals to said moving contact; a first demodulator for producing a D.C. output from an A.C. input; a first transformer for coupling said first modulator output to said first demodulator as an input, said first transformer including a center-tapped input winding with said fixed contacts of said chopper connected across the ends thereof; a second modulator for producing an A.C. output; a second demodulator for producing a D.C. output from an A.C. input; a second transformer for coupling said second modulator output to said second demodulator as an input; first circuit means for coupling at least a portion of the output of said first demodulator to said output terminals and to said second modulator as an input; and second circuit means connected to the output of said demodulator, said second circuit means being connected to another of said input terminals and to the center tap of said input winding for coupling at least a portion of the output of said second demodulator and a signal at the input terminals in series in negative feedback relation between said moving contact and the center tap of said input winding.

8. In a device for transferring a potential difference between input and output terminals, the combination of: input terminals and output terminals; a first modulator for producing an A.C. output, said modulator including a mechanical chopper having a moving contact and a pair of fixed contacts; means connecting one of said input terminals to said moving contact; a first demodulator for producing a D.C. output from an A.C. input, said demodulator comprising a pair of transistor switches operated as a full wave rectifier; a first transformer for coupling said first modulator output to said first demodulator as an input, said first transformer including a center-tapped input winding with said fixed contacts of said chopper connected across the ends thereof; means for coupling an A.C. voltage source to said first modulator and to said first demodulator for driving said moving contact and said transistor switches in synchronism; a second modulator for producing an A.C. output; a second demodulator for producing a D.C. output from an A.C. input; a second transformer for coupling said second modulator output to said second demodulator as an input; first circuit means for coupling at least a portion of the output of said first demodulator to said output terminals and to said second modulator as an input, said first circuit means including an amplifier; and second circuit means connected to the output of said second demodulator, said second circuit means being connected to another of said input terminals and to the center tap of said input winding for coupling at least a portion of the output of said second demodulator and a signal at the input terminals in series in negative feedback relation between said moving contact and the center tap of said input winding.

9. In a feedback amplifier for generating a potential across a pair of output terminals, one of which is at circuit ground, in response to a potential difference existing between a pair of input terminals which have an unknown or varying potential difference with respect to said circuit ground, the combination of: a signal amplifier producing an A.C. output which is a function of a D.C. input, the output being conductively and electrostatically isolated from the input thereto; a feedback impedance; a demodulator having the output of said signal amplifier as an input; a D.C. output operational amplifier having the output of said demodulator as an input and developing a D.C. output at said output terminal; an electrical feedback circuit connected between said operational amplifier and said feedback impedance for developing a D.C. potential across said feedback impedance, said feedback circuit including a modulator coupled through a transformer to a demodulator, said feedback circuit having at least a portion of the output of said operational amplifier as an input and having an output which is conductively and electrostatically isolated from the input thereof; and circuit means connected to said input terminals, said feedback impedance and said signal amplifier for coupling a potential difference at said input terminals in inverse feedback relation with at least a portion of a potential difference developed across said feedback impedance to provide an input to said signal amplifier.

10. In a device for transferring a potential difference between input and output terminals, the combination of: input terminals and output terminals, a forward circuit path including a first modulator, signal isolating means having an input and an output, the output being conductively and electrostatically isolated from the input thereof, means coupling the input of said signal isolating means to the output of said first modulator, a first demodulator operated in synchronism with said first modulator and having an input connected to the output of said signal isolating means, and an amplifier having a high gain and very low output impedance having an input connected to the output of said first demodulator and an output connected to said terminals; and a feedback circuit path including a second modulator, means coupling the input of said second modulator to the output of said amplifier, a transformer having an input and an output, means coupling the input of said transformer to the output of said second modulator, a second demodulator operated in synchronism with said second modulator and having an input connected to the output of said transformer, and a feedback impedance coupled to the output of said second demodulator; and means connecting at least a portion of said feedback impedance in series circuit with said input terminals, said first modulator and the input of said signal isolating means.

11. In a device for transferring a potential difference from an input to an output, the combination of: a pair of input terminals; a pair of output terminals; a feedback impedance; first signal isolating means having an input and an output, the output being conductively and electrostatically isolated from the input thereof; second signal isolating means having an input and an output, the output being conductively and electrostatically isolated from the input thereof, said signal isolating means including a modulator coupled through a transformer to a demodulator; a first circuit means connected to said input terminals, said feedback impedance and said first signal isolating means for coupling a potential appearing across said input terminals in series with at least a portion of a potential appearing across said feedback impedance as an input to said first signal isolating means; second circuit means having an input and an output and including an amplifier for amplifying a signal between said input and output with a very high gain and having a very low impedance at the output thereof; a third circuit means for coupling the input of said second circuit means to the output of said first signal isolating means; a fourth circuit means for coupling the output of said second circuit means across said output terminals and to said second signal isolating means as an input; and fifth circuit means for coupling the output of said second signal isolating means across said feedback impedance.

References Cited in the file of this patent
UNITED STATES PATENTS

| | | |
|---|---|---|
| 2,224,580 | Wise | Dec. 10, 1940 |
| 2,688,729 | Offner | Sept. 7, 1954 |
| 2,901,563 | McAdam | Aug. 25, 1959 |

UNITED STATES PATENT OFFICE
CERTIFICATE OF CORRECTION

Patent No. 3,130,373　　　　　　　　　　　　　　　April 21, 1964

Noel B. Braymer

It is hereby certified that error appears in the above numbered patent requiring correction and that the said Letters Patent should read as corrected below.

Column 3, line 42, strike out "of"; line 72, for "operation" read -- operational --; column 4, line 66, for "reducetion" read -- reduction --; column 5, line 41, for "of" read -- for --; line 47, after "D.C." strike out the comma; column 10, line 17, after "modulator," insert -- a --; line 27, after "said" insert -- output --.

Signed and sealed this 17th day of November 1964.

(SEAL)
Attest:

ERNEST W. SWIDER
Attesting Officer

EDWARD J. BRENNER
Commissioner of Patents